United States Patent [19]

McCormack et al.

[11] 4,309,980
[45] Jan. 12, 1982

[54] CLOSED VAPORIZATION HEAT TRANSFER SYSTEM

[75] Inventors: Richard A. McCormack, La Jolla; Eric A. Jensen, Del Mar, both of Calif.

[73] Assignee: Thermal Energy Storage, Inc., San Diego, Calif.

[21] Appl. No.: 128,128

[22] Filed: Mar. 7, 1980

[51] Int. Cl.³ ............................................. F24J 1/00
[52] U.S. Cl. ..................................... 126/263; 62/119; 62/498; 62/514 R; 165/1; 165/DIG. 17
[58] Field of Search ........................ 62/119, 514, 498; 165/1, 186, DIG. 17; 126/271.1, 263

[56] References Cited

U.S. PATENT DOCUMENTS

| | | | |
|---|---|---|---|
| 4,114,591 | 9/1978 | Hakagawa | 126/263 |
| 4,161,211 | 7/1979 | Duffy et al. | 165/DIG. 17 |
| 4,186,794 | 2/1980 | Brumberg et al. | 62/478 X |
| 4,192,371 | 3/1980 | Derouette et al. | 165/DIG. 17 |
| 4,199,952 | 4/1980 | Berg | 62/478 |
| 4,206,745 | 6/1980 | Gilgen | 62/118 X |
| 4,209,413 | 6/1980 | Kent et al. | 126/263 |

*Primary Examiner*—Edward G. Favors
*Attorney, Agent, or Firm*—Brown & Martin

[57] ABSTRACT

Closed heat transfer system including a body of water in a first container, a body of aluminum compound in a second container and a conduit connecting the containers, the system being operative in a first step to evaporate water from the first container to cool it by withdrawing heat of vaporization which is supplied to the water at relatively low temperature and to react the water vapor with the aluminum compound in the second container to generate heat at relatively high temperature and to combine with the water so that the water vapor pressure remains low and water continues to evaporate from the body of water for continued cooling, and the system operating in a second stage by supply of heat to the reaction products of the water and aluminum compound to restore the aluminum compound to its initial condition by driving off water which is condensed and returned to the body of water in the first container.

17 Claims, 1 Drawing Figure

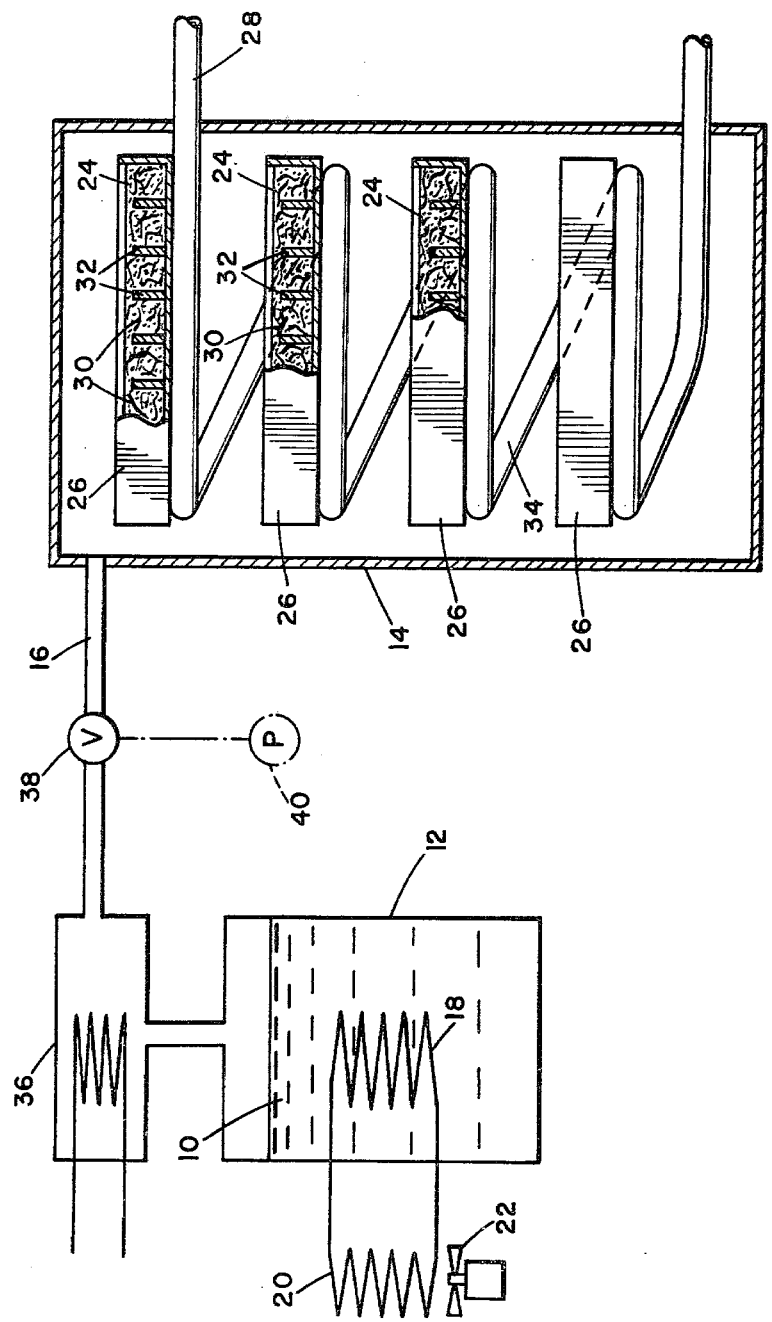

CLOSED VAPORIZATION HEAT TRANSFER SYSTEM

FIELD OF THE INVENTION

This invention relates to a closed vaporization heat transfer system and particularly to a system useful for air conditioning and heating.

BACKGROUND OF THE INVENTION

Heat transfer systems based on a chemical heat pump are effective to store thermal energy through reaction pairs. They are effective to convert low temperature heat to high temperature heat and are able to achieve coefficients of performance greater than unity when heating and have the additional ability to store thermal energy over long periods with minimum loss and at high energy densities.

By reason of these factors, chemical heat pumps have potential utility in using off-peak energy in power plants, in utilizing solar thermal, ocean thermal, geothermal industrial and nuclear waste thermal energy, in thermal energy storage and in other applications having temporal and spatial energy storage problems.

Chemical heat pumps use chemical reactions of the type: absorbent (dry)+vapor⇌absorbent (wet)-+generated heat.

A known system, shown in the U.S. Pat. Nos. to Brunberg et al 4,205,531 of June 30, 1980 and 4,186,794 of Feb. 5, 1980, uses sodium sulfide and water as working substances. In this system, liquid water is disposed in one chamber and the sodium sulfide is disposed in a second chamber which is connected to the first chamber by a pipe which is fitted with a condenser and a valve. The system is brought to an operating pressure less than atmospheric pressure by a vacuum pump. In operation, water is evaporated from the first container, passes through the pipe and take up by the sodium sulfide according to the following equation:

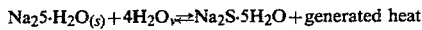

$Na_2S \cdot H_2O_{(s)} + 4H_2O_v \rightleftharpoons Na_2S \cdot 5H_2O + \text{generated heat}$ In this reaction, heat is supplied from a low temperature source to vaporize the water from the body of liquid. The water vapor passes through the pipe into the body of sodium sulfide where it reacts to liberate heat at a higher temperature. The reaction is reversible by supplying heat from a high temperature source to the hydrated sodium sulfide to drive off the water as water vapor which passes through the pipe and is condensed and returned to the body of liquid water.

While this system offers many advantages, the working material, sodium sulfide, is classified as a "dangerous substance," comparable to caustic soda and in fact is explosive at high temperatures. Additionally, its heat conductivity is relatively low so that difficulty in transfer of heat to or from the sodium sulfide reduces the effectiveness of the system.

Other reaction pairs such as $SrBr_2 \cdot 6H_2O \rightleftharpoons SrBr_2 \cdot H_2O + 5H_2O$, $FeI_2 \cdot 6NH_3 \rightleftharpoons FeI_2 \cdot 2NH_3 + 4NH_3$ and $FeCl_2 \cdot 6NH_3 \rightleftharpoons FeCl_2 \cdot 2NH_3 + 4NH_3$ have been suggested but present difficulties such as development of corrosive substances, hazards from escaping fumes and costly equipment requirements.

A process and apparatus based on a similar principle but not operating under vacuum conditions effective to remove gases and vapors other than water vapor shows a list of vapor absorptive materials including various metal oxides and chlorides, urea and activated alumina. It is understood that no apparatus according to this patent has been built presumably because the need to eliminate residual gases in the apparatus was not recognized and the presence of these gases interfered with the effective operation.

Various other patents relating to heating or cooling systems include British Pat. No. 1,571,485 which effects cooling by adding liquid water to crystalline urea, German Pat. No. 27 10 287 corresponding to British Pat. No. 1,557,416 shows generation of heat by reacting or dissolving calcium oxide in water and German Pat. No. 22 33 107 which shows cooling hot gases by passing them through fine particles of copper oxalate or aluminum chloride hexahydrate.

BRIEF SUMMARY OF THE INVENTION

It is an object of the present invention to provide a closed vaporization heat transfer system useful for air conditioning and heating including a novel reaction pair of safe, cheap and efficient working substances disposed in a two chamber apparatus.

In the system of the present invention, selected aluminum compounds and water cooperate in a simple closed system to provide a safe and efficient recyclable operation useful both for heating and for cooling and capable of repeated recycling without substantial change in operating characteristics.

DESCRIPTION OF THE DRAWING

The invention will be described in connection with the attached drawing in which the FIGURE is a diagrammatic view of a closed vaporization cooling system employing the present invention.

DESCRIPTION OF THE PREFERRED EMBODIMENT

The closed vaporization heat transfer system of the present invention provides a combination of selected reversible reaction pairs in associated chambers with temperature control devices including heat exchangers in contact with the working substances to make use of cooling or heating developed in the chambers and to provide to the materials in the chambers energy needed in successive cycles of the system.

Reaction pairs used in the present system employ water as the volatile liquid phase change member and aluminum compounds as the solid material operates to combine with water by hydration. Aluminum oxide hydroxides and the tri-hydroxides such as $Al(OH)_3$ and $Al(OH)$, are the preferred solids because of their hydration and dehydration properties and their high heat conductivity as well as their safety, lack of physical dimensional change during hydration and dehydration and non-corrosiveness. Aluminum oxide hydroxides and the tri-hydroxides occur abundantly in nature in varying degrees of purity. In the present system, no special purification is necessary so that this material is available in essentially unlimited quantities and at a reasonable price. Aluminum fluoride and aluminum sulphate are also useful and offer advantages in special situations.

Use of water as a member of the reaction pair offers the advantage that in its phase change from liquid to vapor, the heat of vaporization is anomalously high because of hydrogen bonding in the complex polymer state existing in liquid water. When water is vaporized, the polymer chains must be broken up into individual molecules. The hydrogen bonds existing in liquid water inhibit this break-up and result in the unusually high amount of heat required for vaporization. Additionally, the hydrogen bonding is responsible for the temperature of vaporization of water which is established in a very desirable temperature-pressure zone for use in the present system. Furthermore, water is non-toxic, substantially inert and non-corrosive so that in the present system it presents no safety hazards in the system.

The reactions of aluminum oxides and hydroxides with water in the present system are absorption and deabsorption according to the following equation:

$$AlO(OH) + H_2O \rightleftharpoons Al(OH)_3$$

In the present system, this means that water undergoes phase change to vapor state and withdraws heat of evaporation from the body of water in the first container for each unit of aluminum oxide. Thus, the cooling effect of the system through this evaporation is roughly seven times the cooling effect of a similar quantity of ice.

Absorption of the water vapor in the aluminum compound releases heat of vaporization through what is in effect a condensation of the water vapor. In addition, the heat of wetting of the aluminum compound is also released. Release of heat aluminum compound raises its temperature to a value at which the heat is readily transferred to a heat sink which is at a readily available temperature to maintain the body of aluminum compound at a temperature at which it will take up water from water vapor at the vapor pressure existing in the system.

That is, the vapor pressure of the body of water varies as a function of the temperature of that body, and the vapor pressure in equilibrium with the aluminum compound varies as a function of the temperature of the aluminum compound so that to continue absorption of water vapor and vaporization of water, heat must be removed from the body of aluminum compound. Thus, at 120° C. aluminum trihydroxide is in equilibrium with water vapor at a pressure of 10 torrs corresponding to a temperature of 11° C. in the body of water, while water vapor pressure 760 torrs (1 atm.) corresponding to a temperature of 100° C. in the body of water is required for equilibrium where the temperature of the aluminum trihydroxide is 175° C. Expressed another way, absorption of water vapor by the aluminum trihydroxide while at 120° C. can cool the body of water to 11° C. by evaporation, but where the aluminum compound is at 175° C., the body of water must be at 100° C. to supply water vapor at a pressure at which it can be absorbed by the aluminum compound.

As shown in the drawing, a body 10 of water is disposed in a first chamber 12, a solid aluminum compound for combination with water vapor is disposed in a second chamber 14 and a conduit 16 extends between the chambers for passage of vapors from one chamber to the other.

Combination of water vapor in the system with the solid aluminum compound reduces the vapor pressure in the system and results in evaporation of water and cooling by extraction of the heat of vaporization from the water in the first chamber 10. A heat exchange element 18, shown as a tubular coil, disposed in the first chamber in contact with the water may be connected to supply heat exchange liquid cooled by the body of water to the coil 19 of an air conditioning device 20 where it cools air blown past it by the fan 22 and absorbs heat for return to the body of water for continued evaporation of water from the chamber 10.

In the second chamber 14, heat is generated when the solid aluminum compound combines with the water vapor. In the system, $AlO(OH) + H_2O \rightleftharpoons Al(OH)_3$, heat generated is 12.5 kcal/mol $H_2O$. Other systems which may be useful include $Al_2(SO_4)_3$ which generates 14 kcal/mol $H_2O$ for hydration to the octadecahydrate from the anhydrous compound and which dehydrates in stages to the hexadecahydrate at 51° C., the tridecahydrate at 80° C., the decahydrate at 97° C., the heptahydrate at 115° C., the quadrahydrate at 150° C., the monohydrate at 180° C. and complete hydrate at 200° C.; and $AlF_3$ which generates 54 kcal/mol for hydration to $AlF_3 \cdot 3\frac{1}{2}H_2O$ from the essentially anhydrous compound and which dehydrates at about 200° C.

A large area of solid substance for interaction with the vapors is provided in the arrangement shown by disposing the solid in finally divided state in porous layers 24 on a series of trays 26. In a preferred form, the trays 26 are formed of metal having high heat conductivity connected in heat transfer relation to a heat exchanger element 28 for passage of heat to or from the solid substance. Improved transfer of heat to and from the body of solid material may be secured by distributing metal, suitably in the form of strands 30 throughout the layers 24 of solid material. Additionally, the support trays 26 themselves may have a surface configuration, such as a fins 32 extending into the layers 24 for better heat transfer between the solid material and the trays 26.

As shown in the drawing, the heat exchanger 28 may be a tubular coil 34 to which the trays 26 are joined by welding, brazing or otherwise. Heat generated by a combination of the solid material with the water vapors may be withdrawn from the chamber 14 by the heat exchanger 28 to maintain the temperature of the material in a range for efficient combination with the water vapor to insure evaporation and desired cooling of the body of liquid water.

Regeneration of the solid material after its combination with water vapor is effected by supplying heat to the solid material to decompose the combination product with evolution of water vapors which pass through the conduit 16. A condenser 36 is provided in the conduit 16 to condense the water vapors to liquid state and return the water to the first chamber 12.

The heating of the solid material may be supplied by passing the heat exchange liquid from the tubular coil 34 into a heat source such as a solar heat collector or through a waste heat recovery system (not shown.) Also, a heating element (not shown,) for example, an electrical resistance element may be provided to supply heat directly to the heat conductive trays 26 to off-peak electrical power.

A valve 38 is disposed in the conduit 16 between the condenser 36 and the second chamber 14 to cut off passage of vapors to the solid material after the solid material has been regenerated. When the valve 38 is closed, the solid material may be maintained indefinitely in a state in which it will produce heat by a combination with water vapors. Thus, storage of heat energy is readily and simply achieved over long periods with only the minor loss of sensible heat of the material reached in the regeneration process.

In a modification, the chamber containing the solid material may actually be separated from the system for regeneration at a heat source and thereafter reconnected in the system.

A vacuum pump 40 is connected in the conduit 16 to remove materials other than the vapors of the working liquid. At the reduced pressure, the temperature of evolution of water vapor from the liquid body is at a useful temperature to abstract heat from ambient sources when the aluminum compound is at a temperature effective for it in turn to disperse heat to an ambient source.

The following example is given to aid in understanding the invention, but it is to be understood that the invention is not limited to the particular materials, procedures or conditions of the example.

EXAMPLE

Pairs of six inch inside diameter glass bell jars were assembled to provide two chambers, each twelve inches high.

In the first chamber, there was disposed a body of water in contact with a tubular heat exchanger coil containing a heat exchange liquid and connected to a finned tubular coil exposed to the atmosphere providing a low temperature heat sink.

In the second chamber, there was disposed a tubular heat exchanger coil having aluminum trays joined to successive turns of the coil and with one inch thick layers of a mixture of aluminum oxide hydroxide i.e., AlO(OH) and aluminum wool in the trays. The heat exchanger coil contained a heat exchange liquid for passage either to an external heat disposal radiator or to a steam supply. A total of one-half cubic foot of the aluminum compound was carried by the trays.

A tube fitted with a valve and with a connection for evacuating the chambers was provided connecting the two chambers.

For operation, the system was first evacuated to a pressure of 10 torrs. Water evaporated from the body of water in the first chamber to cool the water and the water vapor passed through the tube and was taken up by the aluminum oxide hydroxide with evolution of heat. In this operation, rate of passage of water vapor through the tube was controlled by adjusting the valve so that the temperature of the water was reduced to just above freezing; and liquid was circulated through the heat exchanger coil and external finned tubular coil to provide cooling useful for air conditioning and to supply to the body of water heat to make up for the heat of vaporization of water.

The temperature of the aluminum oxide hydroxide in the second chamber increased due to the heat generated by absorption of water vapors by the aluminum oxide and this heat was drawn off by the heat exchanger. Approximately, 4750 kcal of heat were taken up from the body of water and generated by the body of aluminum oxide hydroxide.

For regeneration of the system, oil at 120° C. was supplied through the heat exchanger coil to cause the water to be deabsorbed as water vapor and to pass through the tube for condensation and return to the body of water in the first chamber.

Comparable results can be obtained in systems where other compounds reacted with water vapor such as aluminum sulfate or aluminum fluoride are used. These compounds may be preferable where their temperatures of dehydration, as disclosed above, better match the temperatures of waste heat or other energy source. The tendencies of these compounds to hydrolyze and liberate sulfuric acid or hydrofluoric acid may be combatted by mixture of basic aluminum tri-hydroxide with the aluminum sulfate or aluminum fluoride in the absorbent bed. Furthermore, a system may be provided including an absorbent dehydrating at a lower temperature such as available from solar heat, either mixed with or in a parallel body with an absorbent dehydrating at higher temperatures as provided by waste heat or off-peak power so that waste heat or off-peak energy may be used to augment the capacity of the system to the extend desirable.

We claim:

1. A closed vaporization heat transfer system for withdrawing heat at a lower temperature and discharging it at a higher temperature comprising a first chamber, a body of solid aluminum compound in said first chamber, heat transfer means disposed to receive heat from or to supply heat to said solid aluminum compound a second chamber, a body of water in said second chamber, means to maintain said system under reduced pressure for removing gases and vapors other than water vapor from the system, heat transfer means disposed to supply heat to or to receive heat from said body of water, a conduit for passage of vapors of said water from one container to the other and adjustable means to control the rate of passage of water vapor between said first and said second chambers to control the rate of evaporative cooling of said body of water or the rate of heating of said body of aluminum compound, said aluminum compound being selected from the group consisting of aluminum oxide hydroxide, aluminum trihydroxide, aluminum sulfate, aluminum fluoride and mixtures of these physically or chemically exothermically reactive with said vapors to form an addition compound, said addition compound being decomposable by heat to regenerate said aluminum compound and said vapors of water.

2. A system as defined in claim 1 comprising a condenser disposed in said conduit to condense water vapors released from said aluminum compound and to return said water to said second chamber.

3. A system as defined in claim 2 in which said means to control the rate of passage of water vapor is a valve disposed in said conduit between said condenser and said second chamber.

4. A system as defined in claim 3 comprising a heat conductive support for said aluminum compound to improve heat transfer.

5. A system as defined in claim 4 in which said heat conductive support is a series of trays carrying said aluminum compound in layers presenting a large surface for contact with water vapors.

6. A system as defined in claim 5 in which said aluminum compound is in finely divided condition and in which said layers are porous for contact of vapors with inner portions of the aluminum compound of said layers.

7. A system as defined in claim 6 in which strands of heat conductive metal are dispersed through the aluminum compound.

8. A system as defined in claim 7 in which said trays include projections extending into said body of aluminum compound to improve heat transfer from said body of said tray.

9. A system as defined in claim 3 in which said aluminum compound comprises an aluminum oxide hydroxide.

10. A system as defined in claim 2 in which the heat transfer means in second chamber is a tubular coil in contact with said body of water and is connected to supply chilled heat exchange liquid to the cooling coil of an air conditioning device.

11. A closed vaporization heat transfer method comprising:
(a) disposing in a sealed system a body of water and a body of an aluminum compound from the group consisting of aluminum oxide hydroxide, aluminum trihydroxide, aluminum sulfate, aluminum fluoride and mixtures of these exothermically reactive with water vapor to form an addition compound decomposable by heat and maintaining said system under reduced pressure to remove gases and vapors other than the water vapor from the system;
(b) conducting water vapor evaporated from said body of water to said body of aluminum compound and controlling the rate of conduction to provide the selected rate of evaporative cooling of said body of water or the selected rate of exothermic reaction of water vapor with said body of aluminum compound;
(c) reacting said water vapor with said aluminum compound to reduce the water vapor pressure in said system to enable continued evaporation of water;
(d) supplying heat from a low-temperature source to said body of water to replace heat of vaporization from said body and withdrawing heat at a higher temperature from said body of aluminum compound at a controlled rates to maintain said body of water and said body of aluminum compound at temperatures for effective supply of heat at said low temperature and withdrawal of heat at said higher temperature;
regenerating said system by heating the addition compound formed by said reaction to decompose it to form said aluminum compound and water vapors;
condensing said water vapor and returning the condensate to said body of water.

12. The heat transfer method defined in claim 11, in which said aluminum compound comprises an aluminum oxide hydroxide.

13. The heat transfer method defined in claim 11 in which said aluminum compound comprises a mixture of aluminum sulfate and an amount of basic aluminum tri-hydroxide to resist evolution of free sulfuric acid.

14. The heat transfer method defined in claim 11 in which said aluminum compound comprises a mixture of aluminum fluoride and an amount of basic aluminum tri-hydroxide to resist evolution of fee hydrofluoric acid.

15. The heat transfer method as defined in claim 11 in which said body of compounds exothermically reactive with water vapor comprises an absorbent dehydrating at a lower temperature and an absorbent dehydrating at higher temperature.

16. The heat transfer method as defined in claim 11 in which the rate of conducting said water vapor from said body of water to said body of aluminum compound is controlled to control the rate of evaporative cooling of said body of water.

17. The heat transfer method as defined in claim 11 in which the rate of evaporative cooling of said body of water is controlled by controlling the temperature of said body of aluminum compound.

* * * * *